United States Patent
Oretti

(10) Patent No.: US 7,021,400 B2
(45) Date of Patent: Apr. 4, 2006

(54) POWER TOOL

(75) Inventor: John Ernest Oretti, Doncaster (AU)

(73) Assignee: Bayly Design Associates Pty. Ltd., Blackburn (AU)

(*) Notice: Subject to any disclaimer, the term of this patent is extended or adjusted under 35 U.S.C. 154(b) by 0 days.

(21) Appl. No.: 10/625,518

(22) Filed: Jul. 24, 2003

(65) Prior Publication Data

US 2005/0077063 A1    Apr. 14, 2005

Related U.S. Application Data

(63) Continuation of application No. PCT/AU02/00075, filed on Jan. 24, 2002.

(30) Foreign Application Priority Data

Jan. 24, 2001 (AU) ................................ PR2721

(51) Int. Cl.
*B25F 5/00* (2006.01)

(52) U.S. Cl. .................... 173/29; 173/48; 173/176; 173/216; 279/62

(58) Field of Classification Search ........... 227/216, 227/176, 179; 279/60, 61, 62; 173/216, 173/176, 179, 48, 213, 217, 29
See application file for complete search history.

(56) References Cited

U.S. PATENT DOCUMENTS

| | | | |
|---|---|---|---|
| 2,716,555 A | 8/1955 | Rowe | |
| 3,732,026 A | 5/1973 | Peters | |
| 4,323,324 A | 4/1982 | Eberhardt | |
| 4,620,539 A | 11/1986 | Andrews et al. | |
| 4,682,918 A * | 7/1987 | Palm | 408/241 R |
| 4,791,833 A * | 12/1988 | Sakai et al. | 475/299 |
| 4,892,013 A * | 1/1990 | Satoh | 173/178 |
| 5,019,023 A | 5/1991 | Kurosawa | 475/269 |
| 5,044,643 A * | 9/1991 | Nakamura | 279/60 |
| 5,145,193 A * | 9/1992 | Rohm | 279/62 |
| 5,277,527 A * | 1/1994 | Yokota et al. | 408/139 |
| 5,339,908 A * | 8/1994 | Yokota et al. | 173/216 |
| 5,553,873 A * | 9/1996 | Salpaka et al. | 279/62 |
| 6,435,521 B1 * | 8/2002 | Steadings et al. | 279/62 |
| 6,655,470 B1 * | 12/2003 | Chen | 173/216 |

FOREIGN PATENT DOCUMENTS

DE        3934283 A1    5/1990

(Continued)

OTHER PUBLICATIONS

International Preliminary Examination Report in PCT/AU02/00075, mailed Sep. 6, 2002 from the IPEA.

(Continued)

*Primary Examiner*—Scott A. Smith
(74) *Attorney, Agent, or Firm*—Finnegan, Henderson, Farabow, Garrett & Dunner LLP

(57) ABSTRACT

This invention relates to a power tool 1 of the kind having a driven member 15 adapted to releasably hold at least one working element 46. The power tool 1 can operate in either a working mode in which the driven member 15 is driven to enable the working element 46 to perform work, or an adjustment mode, in which the driven member 15 is adjusted to grip or release the working element 46. The power tool 1 includes a selector 17 operable to cause the power tool 1 to operate in either the working or adjustment mode. A power drill 1 is one form of power tool to which the invention is applicable.

5 Claims, 6 Drawing Sheets

FOREIGN PATENT DOCUMENTS

| | | |
|---|---|---|
| EP | 0623422 B1 | 7/1996 |
| EP | 876883 A | 11/1998 |
| EP | 1080850 | 3/2001 |
| FR | 1 602 481 A | 11/1970 |

OTHER PUBLICATIONS

International Search Report, mailed Feb. 19, 2002 for PCT/AU02/00075.

* cited by examiner

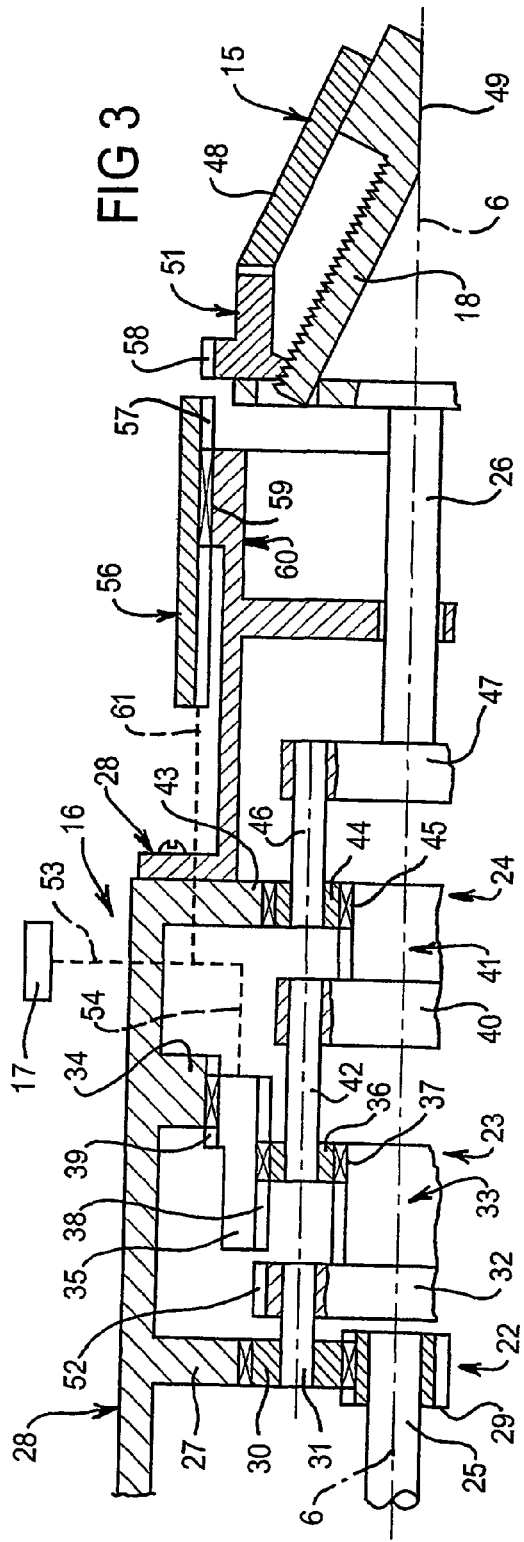

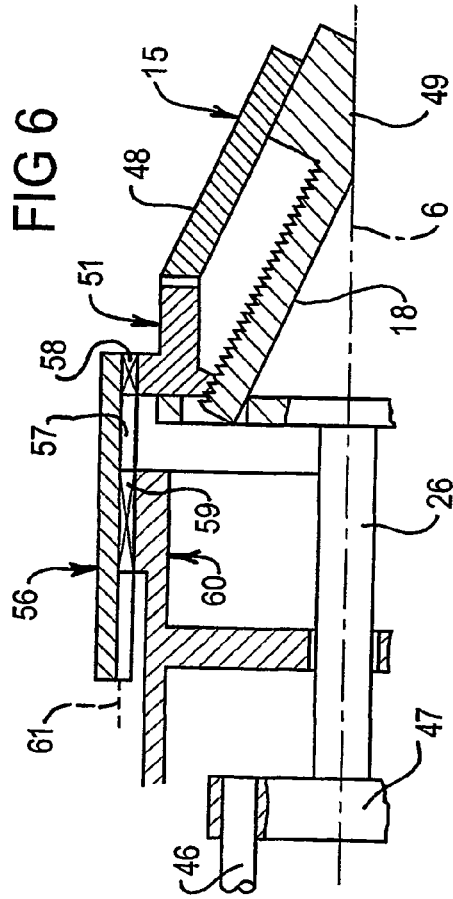
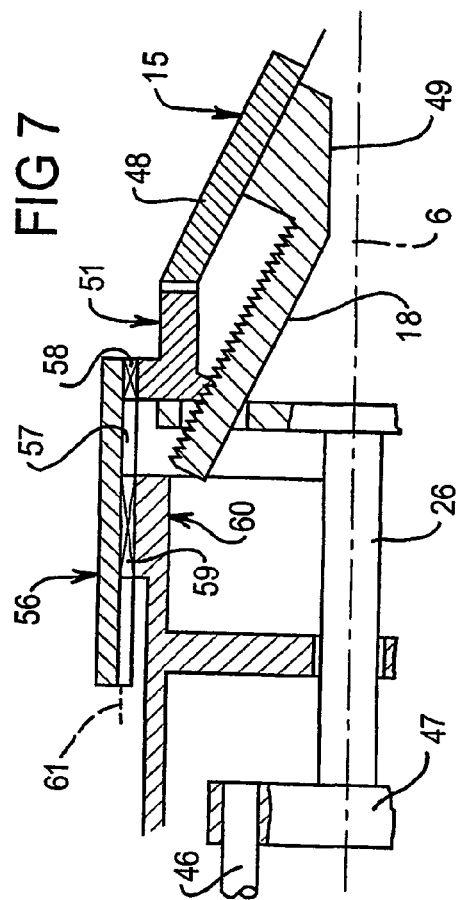
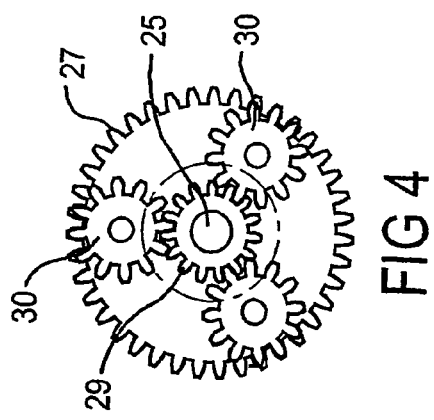
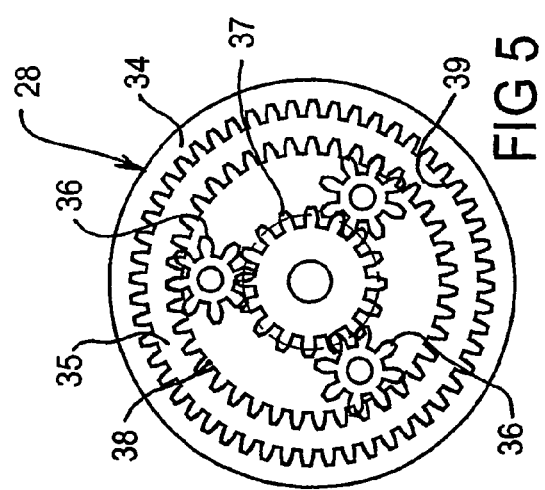

POWER TOOL

RELATED APPLICATIONS

This application is a continuation and claims priority of PCT/AU02/00075, filed Jan. 24, 2002, which claims priority of Australian Patent Application No. PR 2721, filed Jan. 24, 2001, both of which incorporated herein by reference.

This invention relates to power tools of the kind having a driven member adapted to releasably hold at least one working element. The invention is applicable to all types of power tools, including powered garden tools. It is applicable to tools in which the working element is a drill bit, a saw blade, a cutting wheel, a grinding wheel, or any other element used to cut, shape, or otherwise treat a workpiece (for example), or is a driving element such as a screwdriver blade, or a socket spanner for example.

A power drill is one form of power tool to which the invention is applicable. In that example application of the invention, the driven member is a chuck, and the working element is a drill bit. It will be convenient to hereinafter describe the invention with particular reference to power drills, but it is to be understood that the invention has broader application. It will also be convenient to hereinafter describe the invention with particular reference to portable power tools, whereas the invention is applicable to power tools of a non-portable nature.

Conventional power drills typically have a three jaw chuck for gripping a drill bit. The chuck jaws are adjustable to suit drill bits of various sizes, and in some cases such adjustment is carried out by use of a key. In other cases it is carried out by manually twisting the outer sleeve of the chuck or alternatively the user grips the outer sleeve and power is applied to the chuck, whereby the user provides a resistance force. In either case, the process of securing or releasing a drill bit can be laborious and time consuming. When the user provides the resistance force, the user's hand can be damaged if the user fails to release the sleeve when the chuck has tightened. Other forms of power tools utilize a key or hand operated driven member and suffer the same inconvenience when removal or replacement of the working element is required.

It is an object of the present invention to provide a power tool that is convenient and safe to use. It is a further object of the invention to provide a power tool having means for driving the gripping jaws of the driven member towards an open or closed condition. It is a still further object of the invention to provide such a power tool in which the jaws are motor driven.

According to the present invention, there is provided a power tool including a driven member that is operable to grip and drive at least one working element, power drive means connected to the driven member the power tool being operable in either a working mode in which the driven member is driven to enable the working element to perform work, or an adjustment mode in which the driven member is adjusted to grip or release the working element, and selector means operable to cause the power tool to operate in one or the other of said modes. It is to be appreciated that the motor could be hydraulically or pneumatically driven, and that the working element could be any device adapted to perform work when driven so as to undergo rotary movement, linear movement, or any other type of movement.

In a preferred embodiment the driven member includes a body part and an adjustment part that when in an adjustment mode are movable relative to one another, to grip or release said working element, and said parts move together when in the working mode. The power drive means is preferably connected to the body part so as to thereby drive the driven member.

The power tool preferably includes locking means operable to engage said adjustment part and thereby enable the two said parts to move relative to one another, and said selector means is operable to cause said locking means to engage with or disengage from said adjustment part. It is preferred that the power tool is in the working mode when said locking means is disengaged from said adjustment part, and is in said adjustment mode when said locking means is engaged with the adjustment part. It is preferred that relative movement occurs in response to operation of the power drive means while the locking means engages the adjustment part.

It is preferred that the power drive means includes a motor and a gear assembly through which said motor is connected to said driven member. It is further preferred that the power drive means is operable to drive said body part at either a slow speed or a relatively fast speed, and is caused by said selector means to drive said body part at said slow speed when in said adjustment mode.

In a preferred embodiment the driven member is a chuck adapted to grip and drive a working element in the form of a drill bit, and said power drive means operates to rotate said chuck during said working mode. It is preferred that the body part is a chuck head and said adjustment part is an adjusting nut, when in adjustment mode the locking means engages the adjusting nut to stop it rotating with the chuck head. It is further preferred that rotation of the chuck head relative to the adjustment nut moves two or more jaws to grip or release the dill bit.

It will be convenient to hereinafter describe the invention in greater detail by reference to the accompanying drawings showing one example embodiment of the invention. The particularity of the drawings and the related detailed description is not to be understood as superseding the generality of the preceding broad description of the invention.

FIG. 3 is a diagrammatic illustration of one form of gear assembly suitable for use in the drill when the mode selection has been operated to select low speed mode.

FIG. 4 illustrates in cross-section, the relationship between gears of the first input system.

FIG. 5 illustrates in cross-section, the relationship between the gears of the second input system.

FIG. 6 illustrates in cross-section the locking means engaging the adjustment nut.

FIG. 7 illustrates the cross-section from FIG. 6 after further rotation of the chuck by the motor.

FIG. 8 is a diagrammatic illustration of the gear assembly when the mode selector has been operated to select high speed mode.

Figure 1:
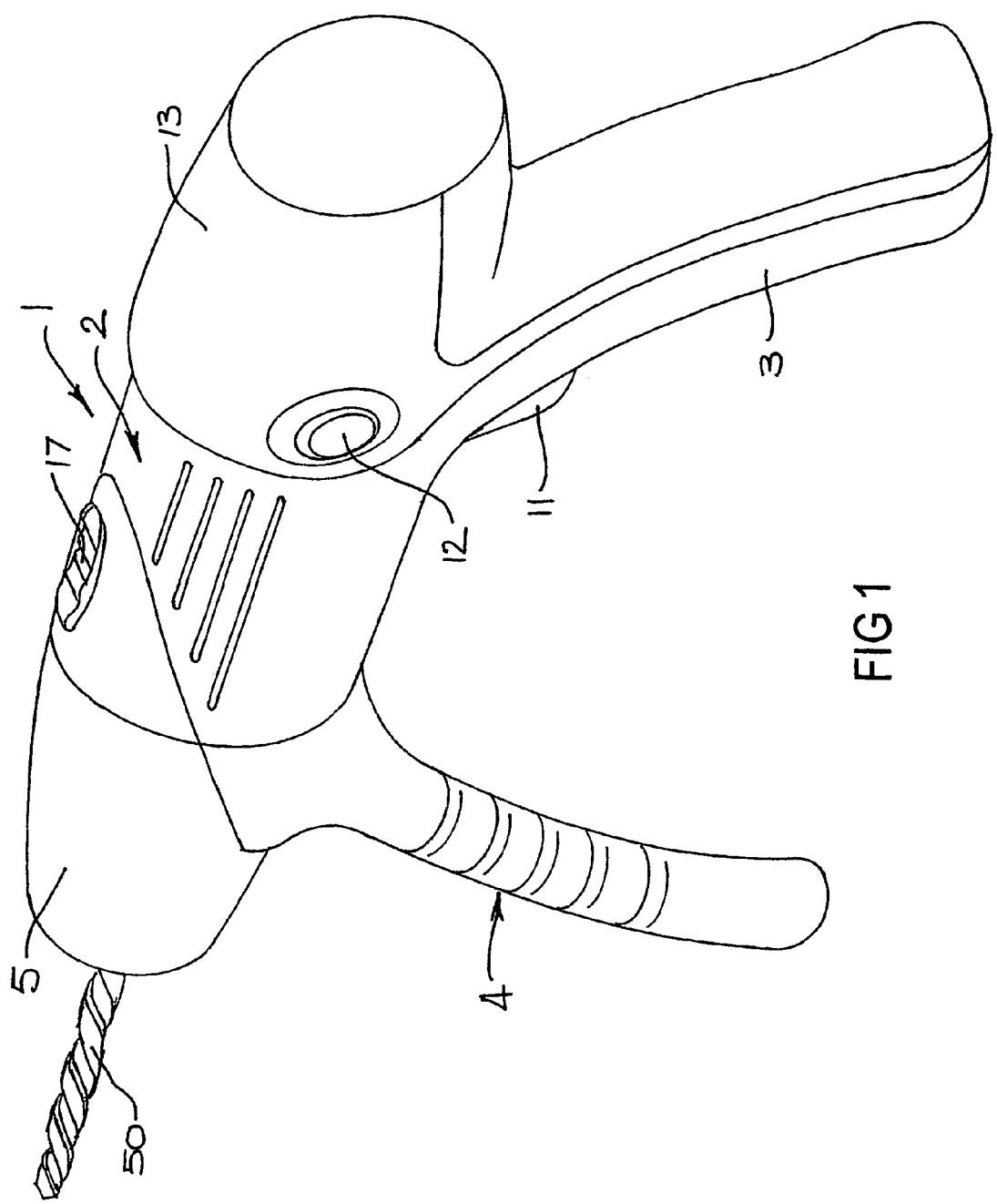
FIG. 1 illustrates in diagrammatic form a preferred embodiment of the power tool to which the invention is applicable.

FIG. 1 of the drawings shows one form of portable power drill to which the invention is applicable, but as previously stated the invention is applicable to other types of power tools, including non-portable power tools. The drill 1 shown in FIG. 1 incorporates an example embodiment of the invention. The drill 1 may be battery operated, or it may be operated by connection to an AC power supply through a DC transformer. The drill 1 as shown by FIG. 1 includes a body 2 having a pistol grip 3 at the back end, and closed loop handle 4 adjacent the front end. It is preferred that the loop handle 4 is connected to a front part 5 of the body 2 that is rotatable about the longitudinal axis 6 (FIG. 2) of the body 2 so that the disposition of the handle 4 can be changed. By way of example, the disposition of the handle 4 may be adjustable relative to the pistol grip 3 so that the handle 4 can be located beneath the body 2 as shown by FIG. 1, or at either side of the body 2, or above the body 2, according to requirements.

It is preferred that handle locking means (not shown) is operable to releasably lock the handle 4 in a selected disposition. A manually engageable button (not shown) or locking nut may be operable to release the locking means so as to permit adjustment of the disposition of the handle 4.

Figure 2:
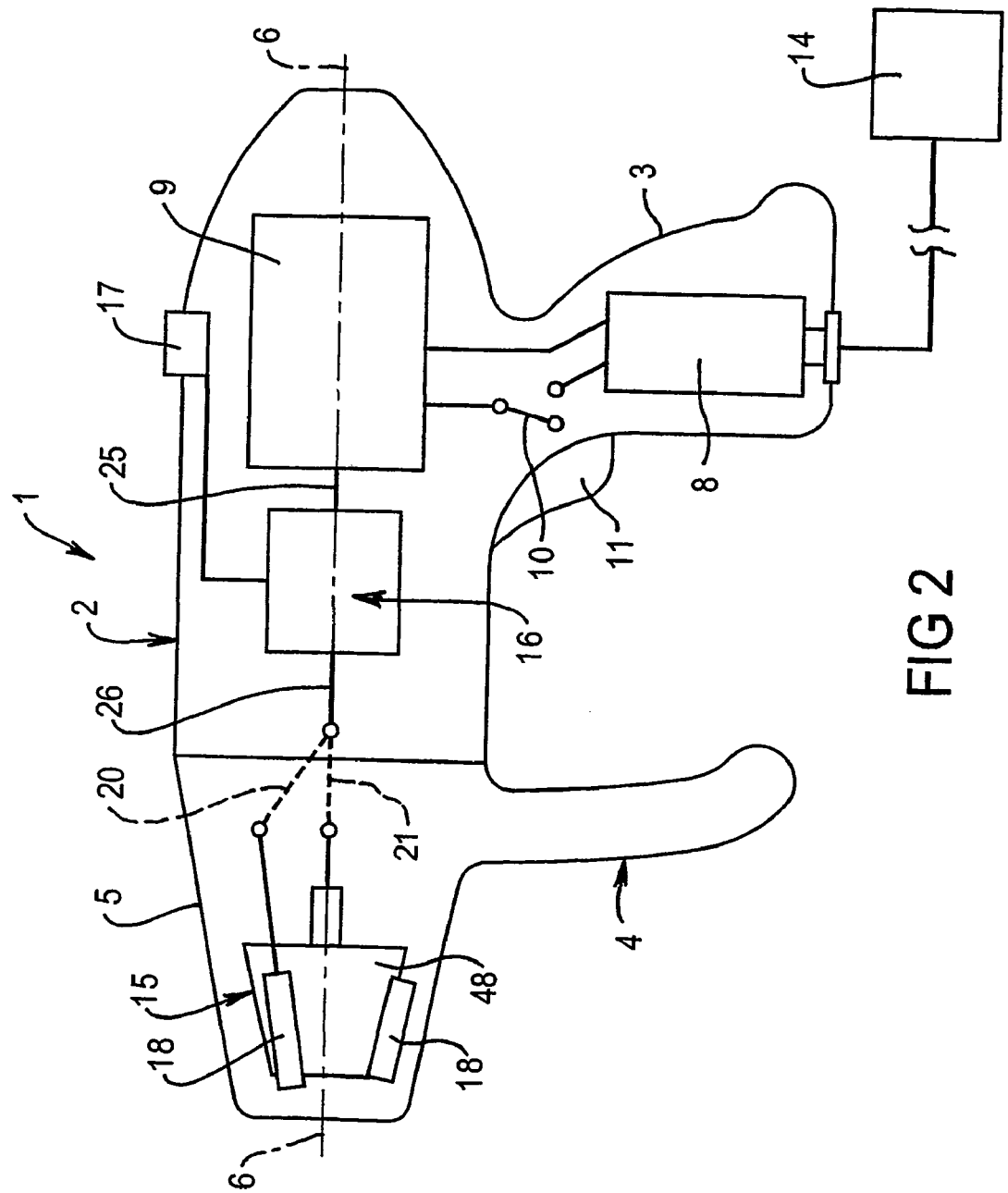
FIG. 2 is a diagrammatic illustration of the power tool from FIG. 1 illustrating some of the features.

FIG. 2 is a diagrammatic illustration of one particular arrangement of the drill 1. In that arrangement, a replaceable battery 8 is located within the pistol grip 3, or within another convenient part of the drill 1, and is connected to the motor 9 through a suitable switch 10. The switch 10 may be opened and closed through operation of a finger engageable trigger 11, and a lock button (not shown) may be operable to releasably hold the trigger 11 in the switch-closed position. Such trigger locks are well known and do not require further description in this specification. Access to the battery 8 may be made possible by operating a lock release button 12 and thereby enabling a rear part 13 to be separated from the remainder of the body 2.

If desired, the motor 9 may be operated by direct connection to an AC power source 14 through the intermediary of a DC transformer (not shown). Alternatively the motor 9 may be operated from a battery 8 supplied for an AC power source 14.

In the particular arrangement shown, the drill 1 includes a three jaw chuck 15 located within the body part 5 and being connectable with the motor 9 through a gear assembly 16. It is preferred that a mode selector 17 is operable to enable the drill 1 to operate in any one of three modes. In one of those modes (the adjustment mode) the motor 9 is operable to adjust the position of the chuck jaws 18 relative to the body part or chuck head. The jaw adjustment connection is illustrated diagrammatically in FIG. 2 by the broken line 20. In each of the other two modes (the drive modes) the gear assembly 16 connects the motor 9 to the chuck 15 in a manner such that the chuck 15 can be driven (rotated) to perform a drilling operation. In one of the drive modes the chuck 15 is rotated at a relatively low speed, and it is rotated at a relatively high speed in the other drive mode. The chuck drive connection is illustrated diagrammatically in FIG. 2 by the broken line 21.

FIG. 3 is a diagrammatic illustration of one form of gear assembly 16 suitable for use in the drill 1. The assembly 16 includes three gear systems, a first input system 22, a second input system 23, and an output system 24. Each of the input systems 22 and 23 is connected to the input shaft 25 through which the motor 9 is connected to the gear assembly 16. The output system 24 is connected to the output shaft 26, which forms part of the connection between the input shaft 25 and the chuck 15.

The first input system 22 includes a ring gear 27 fixed to a body 28 of the gear assembly 16, which is in turn connected to the drill body 2 (not shown in FIG. 3). The input system 22 also includes sun gear 29 that is rotatable with the input shaft 25, and three planet gears 30, each of which meshes with both the ring gear 27 and the sun gear 29. Each planet gear 30 is rotatably mounted on a respective spindle 31 arranged parallel to the axis 6, and each spindle 31 is connected to a flange 32 of a first transfer member 33.

The transfer member 33 is mounted for rotation about the axis 6, and forms part of a connection between the input systems 22 and 23. It will be apparent that other means could be adopted to connect the systems 22 and 23. The relationship between the gears 27, 29 and 30 is indicated by FIG. 4.

The second input system 23 includes a first ring gear 34 fixed to the body 28, a second ring gear 35 that is moveable relative to the body 28 in the direction of the axis 6, three planet gears 36, and a sun gear 37 fixed to the member 33. As best shown by FIG. 5, each planet gear 36 meshes with the sun gear 37 and the inner teeth 38 of the ring gear 35, and outer teeth 39 of the ring gear 35 mesh with the fixed ring gear 34 in the mode of operation as shown by FIG. 3. Each planet gear 36 is connected to the flange 40 of a second transfer member 41 through a spindle 42 on which the planet gear 36 is rotatably mounted (FIG. 3). The member 41 is mounted for rotation about the axis 6. The input system 23 is thereby connected to the output system 24, but other arrangements could be used for that purpose.

The output system 24 includes a ring gear 43 fixed to the body 28, three planet gears 44, and a sun gear 45 that forms part of or is connected to the transfer member 41. Each planet gear 44 meshes both with the ring gear 43 and the sun gear 45. The output system 24 can be connected to the output shaft 26 in any appropriate manner. In the particular arrangement shown, each planet gear 44 of the output system 24 is connected to the output shaft 26 so as to transmit drive to that shaft. For that purpose, each planet gear 44 may be rotatably mounted on a respective spindle 46, each of which is connected to a flange 47 secured to the shaft 26. Other drive arrangements could be adopted.

Drive can be transmitted from the output shaft 26 to the chuck 15 in any appropriate manner, and the chuck 15 can be of any suitable construction. In the particular arrangement shown, the chuck 15 includes a head portion 48 that is connected to the shaft 26 and carries three jaws 18. Each jaw 18 has a gripping face 49 adapted to clamp against the shank of a drill bit 50 (FIG. 1), and adjustment means is provided to enable the jaws 18 to be moved as required according to the diameter of the drill bit 50 to be engaged.

In the particular arrangement shown, each jaw 18 is slidably mounted on the head portion 48 so as to be moveable relative to the head portion 48 along a path arranged angularly relative to the axis 6. The adjustment means includes an adjusting nut 51 rotatably mounted on the head portion 48 and meshing with each jaw 18 through a thread or worm connection. The arrangement is such that rotation of the nut 51 relative to the head portion 48 moves the gripping face 49 of each jaw 18 either towards or away from the axis 6, as shown by FIGS. 6 and 7.

It is preferred that the chuck 15 can be driven at either a high speed of rotation or a low speed of rotation. For that purpose, the mode selector 17 may be operable to select either the high speed mode or the low speed mode.

FIG. 3 illustrates the condition of the gear assembly 16 when the low speed mode has been selected. In that mode, the input shaft 25 drives the first input gear system 22 through rotation of the sun gear 29. In the particular arrangement shown, the planetary gear system 22 functions as a speed reduction mechanism. That is, because the planet gears 30 mesh with a fixed gear 27 and a rotating sun gear 29, the speed of rotation of the system 22 at the axis of each planet gear 30 is less than the speed of rotation of the sun gear 29. The transfer member 33 rotates at the same relatively low speed because of its connection with the system 22 through the spindles 31.

The second input system 23, when arranged as shown by FIG. 3, provides a further speed reduction because it is a planetary gear system similar to the system 22. In that regard, it is relevant that the second ring gear 35 meshes with the fixed ring gear 34, and is thereby held against rotation relative to the body 28. The planet gears 36 therefore mesh with a fixed ring gear 35 and a rotating sun gear 37, and as a consequence the speed of rotation of the system 23 at the axis of each planet gear 36 is less than the speed of rotation of the sun gear 37. The transfer member 41 rotates through the drive connection formed by the spindles 42, and therefore rotates at a speed less than that of the transfer member 33.

Further speed reduction occurs between the transfer member 41 and the output shaft 26 because those two components are connected through a planetary gear system 24 which functions in the same manner as the gear system 22. The speed reduction influence of the gear system 24 may be the same as or different to the speed reduction influence of either of the input gear systems 22 and 23, according to requirements. It will be appreciated that in some circumstances, there may not be a need for a third speed reduction, in which event the planetary gear system 24 could be omitted.

FIG. 8 shows the change in the gear assembly 16 that arises when the mode selector 17 has been operated to select the high speed mode. When that selection is made, the ring gear 35 is caused to move axially to the left so as to mesh with a pinion gear 52 and separate from the fixed ring gear 34. The pinion gear 52 forms part of or is fixed to the transfer member 33 so as to rotate with that member. As shown by FIG. 8, the ring gear 35 remains in engagement with the planet gears 36 and thereby locks those gears against rotation relative to both the sun gear 37 and the ring gear 35. The speed reduction influence of the second input system 23 is thereby removed, and in the particular arrangement shown the speed of rotation at the axis of each planet gear 36 is the same as the speed of rotation of the transfer member 33. It follows that the transfer member 41 is rotated at the same speed which is a higher speed than occurs in the arrangement as shown by FIG. 3. The gear system 24 retains its speed reduction influence, but the speed of rotation of the output shaft 26 is nevertheless higher than in the FIG. 3 arrangement.

Figure 9:
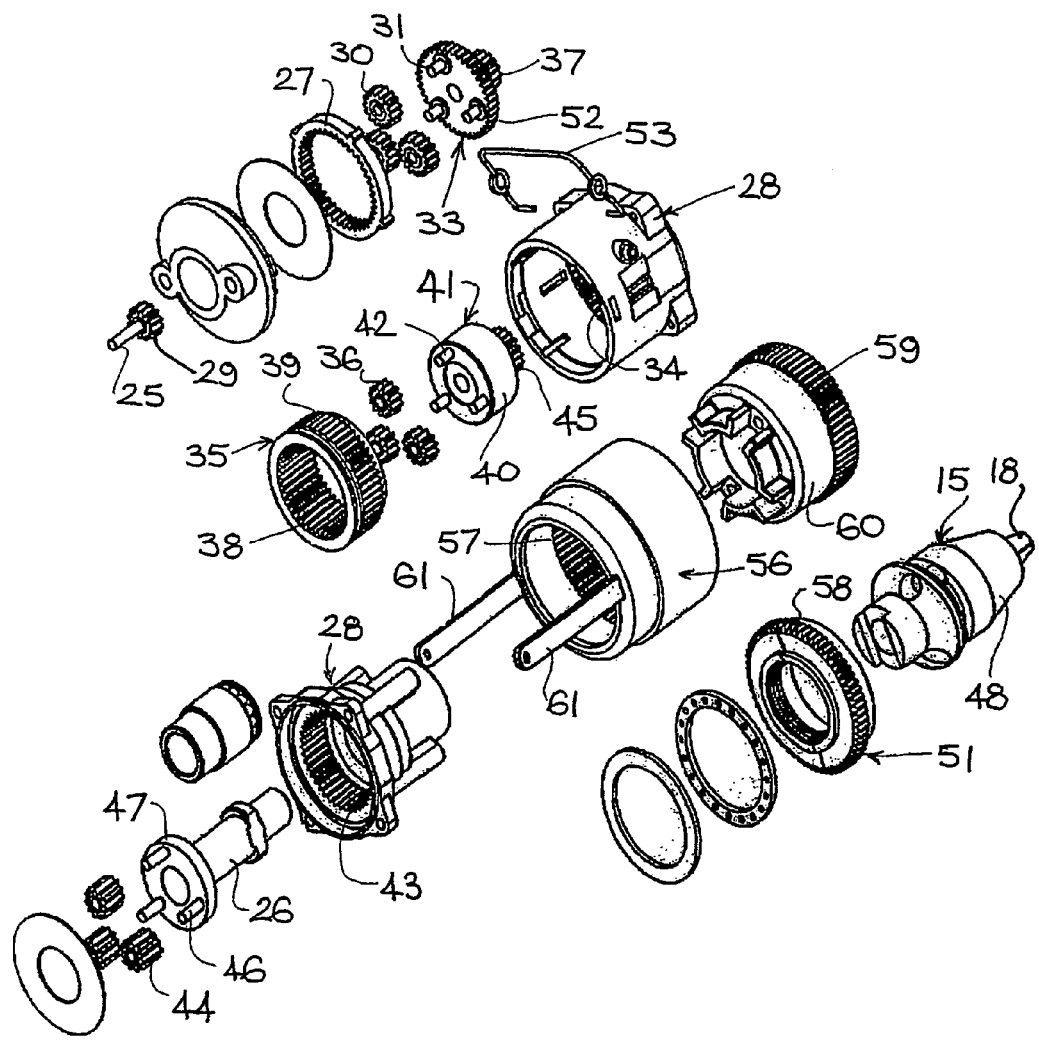
FIGS. 9 and 10 are exploded views of the gear assembly.
Figure 10:
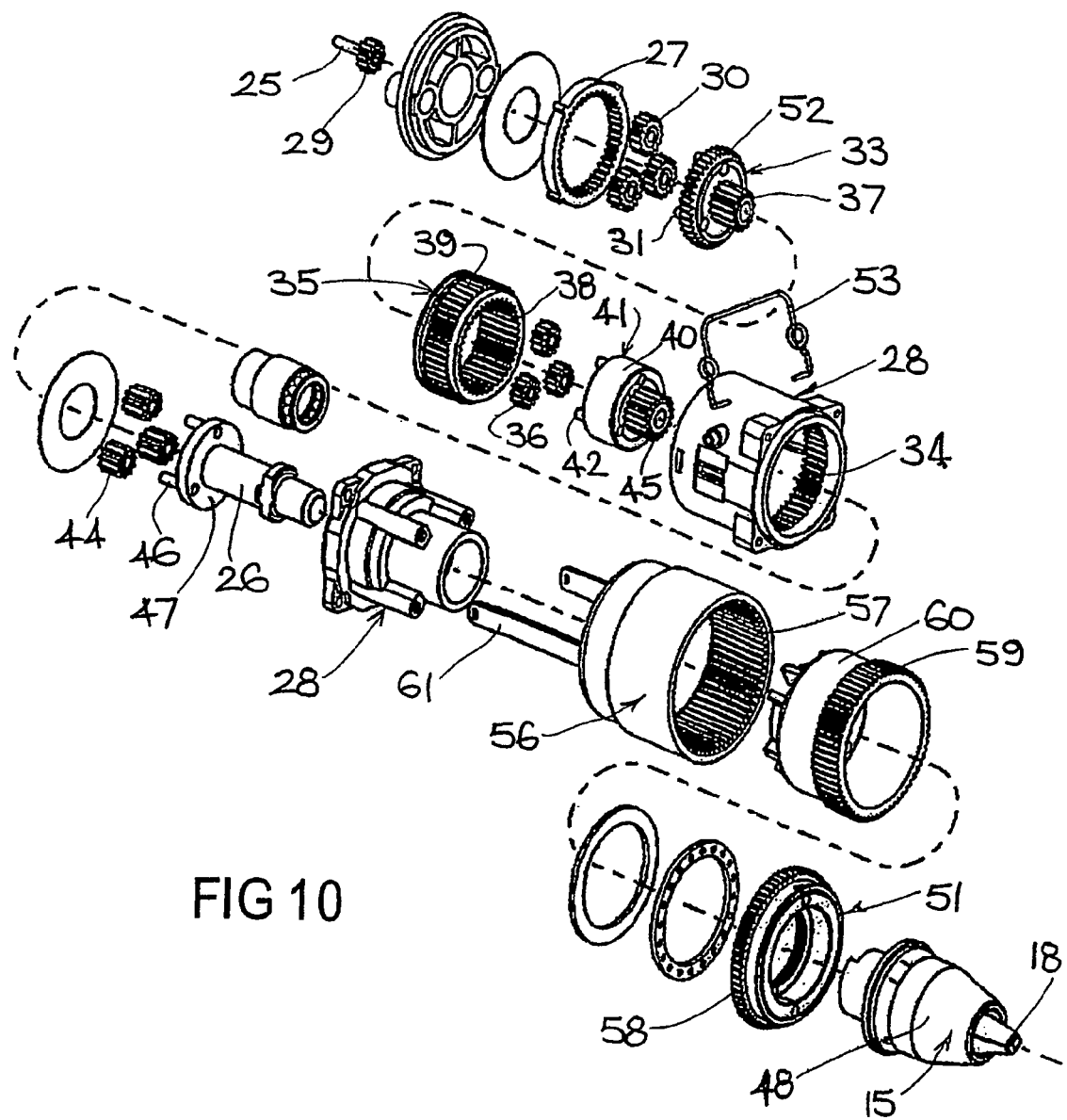

FIGS. 9 and 10 are exploded views of the gear assembly 16 as particularly described in the preceding passages of this specification.

Any suitable mechanism could be adopted to cause the ring gear 35 to move between the two positions as shown by FIGS. 3 and 8 respectively. In the particular arrangement shown, that mechanism includes a lever 53 pivotally mounted on the gear assembly body 28 and arranged to be moved about the pivot mounting by operation of the selector 17. The lever 53 can be connected to the ring gear 35 in any suitable manner, such as by means of a linkage 54 (FIGS. 3 and 8).

It is preferred that the motor 9 is of the reversible type, and any suitable means may be adopted to enable selection of forward or reverse rotation of the chuck 15. A drive direction selector facility may be provided at a convenient location, such as at the back end of the drill body 2.

The drill 1 may be provided with means whereby adjustment of the chuck jaws 18 can be effected through operation of the motor 9. Such power adjustment of the chuck 15 can be achieved in any suitable manner, and one example arrangement will now be described by reference to FIGS. 3, 6, 7 and 8.

In the example arrangement, locking means is provided enabling the chuck adjusting nut 51 to be releasably locked against rotation with the chuck head 48. When the nut 51 is in that locked position, forward or reverse rotation of the chuck head 48 results in coaction between the jaws 18 and the nut 51 such that the position of the jaws 18 is adjusted inward or outwards, according to the direction of the rotation of the motor 9. Various releasable locking arrangements could be adopted for the foregoing purpose. One example arrangement is shown in the accompanying drawings and is described below.

In the particular arrangement shown, a locking sleeve 56 is mounted on the gear assembly body 28 at a location within the drill body 2 adjacent the chuck 15. The sleeve 56 is mounted so as to be moveable relative to the chuck 15 in the direction of the axis 6. FIGS. 3 and 8 show the sleeve 56 in a chuck unlocked condition, and FIGS. 6 and 7 show the sleeve 56 in a chuck locked position. Locking engagement between the sleeve 56 and the chuck 15 can be achieved in any suitable fashion. In the arrangement shown, the sleeve 56 is provided with an internal spline 57 that is cooperatively engageable with an external spline 58 formed on the adjustment nut 51. The sleeve 56 may be held against rotation relative to the body 28 by cooperative engagement between the spline 57 and an external spline 59 of a member 60 fixed to or forming part of the body 28. Other arrangements could be adopted to hold the sleeve 56 against rotation whilst permitting it to move in the direction of the axis 6.

The position of the sleeve 56 may be adjusted directly by the user, or by means of the mode selector 17. When using the mode selector 17, by way of example, the sleeve 56 may be connected to the ring gear 35 so as to move with that gear. Any suitable means may be adopted for that purpose including linkage means 61 connected to the selector lever 53. Such simultaneous 20 movement of the sleeve 56 and the ring gear 35 is illustrated by FIGS. 3 and 8. That is, FIG. 8 shows the ring gear 35 moved to the left of the position shown by FIG. 3, and also shows the sleeve 56 moved in the same direction to substantially the same extent.

The locked condition of the chuck nut 51 is achieved by moving the sleeve 56 to the right beyond the position shown by FIG. 3 so that the FIG. 6 position is adopted. It is preferred that the corresponding movement of the ring gear 35 is such as to leave that gear in meshing engagement with both the fixed ring gear 34 and the sun gear 36. Under those circumstances, adjustment of the chuck jaws 18 is effected while the chuck head 48 is rotating in the slow speed mode. Other arrangements could be adopted.

After completion of a chuck adjustment operation, the selector 17 can be operated to select either the low speed mode (FIG. 3) or the high speed mode (FIG. 8). As will be apparent from FIGS. 3 and 8, the sleeve 56 is separated from the chuck nut 47 in both of those situations.

It will be apparent from the foregoing description that a power tool incorporating the invention is convenient to use. It is also safe to use because of the absence of a key for enabling operation of the tool gripping device. Such keys can cause serious injury if left on the tool when the tool is operated. Furthermore operation of the tool gripping device is achieved without the user supplying a resisting force, thereby reducing the likelihood of damaging the user's hand. Other features and advantages of a power tool incorporating the invention will be apparent from the foregoing detailed description of an example embodiment of the invention.

Finally it is to be understood that various alterations, modifications and/or additions may be introduced into the constructions and arrangements of parts previously described without departing from the spirit or ambit of the invention as defined in the accompanying claims.

The invention claimed is:

1. A power tool for use with a working element, the power tool being operable in either a working mode or an adjustment mode, the power tool including:
    a driven member having a body part and an adjustment part that when in the adjustment mode are moveable relative to one another to grip or release the working element, and when in the working mode the body part and adjustment part move together to drive the working element to enable the working element to perform work,
    a power drive including a motor and a gear assembly through which the motor is connected to the body part to drive the body part at either a slow speed or a relatively fast speed about an axis of the power tool,
    a lock operable to engage said adjustment part and enable the adjustment part to move relative to the body part when the body part is driven by the power drive, the lock includes a locking sleeve having a bore formed with a plurality of splines formed on an inner surface of the bore, the adjustment part including a plurality of complementary splines formed on an outer surface thereof, the splines of both the locking sleeve and adjustment part having a major length dimension that extends in the direction of the axis of the power tool allowing the locking sleeve to move in the direction of the axis of the power tool so that the locking sleeve surrounds the adjustment part to enable the splines of the locking sleeve to mesh with the splines of the adjustment part when the power tool is in the adjustment mode, and disengage from each other when the power tool is in the working mode; and
    a selector operable to cause the power tool to operate in the working mode or the adjustment mode, the selector being connected to the locking sleeve to move the locking sleeve to cause said locking sleeve to engage with or disengage from said adjustment part, the selector being connected to the gear assembly to enable adjustment of the power drive between the slow speed and the fast speed, whereby the connection of the selector to the gear assembly and the locking sleeve is such to limit the power drive to driving the body part at the slow speed when the power tool is in the adjustment mode.

2. A power tool according to claim 1, wherein said driven member is a chuck adapted to grip and drive a working element in the form of a drill bit, and said power drive operates to rotate said chuck about an axis of the power tool during said working mode.

3. A power tool according to claim 2, wherein said body part is a chuck head and said adjustment part is an adjusting nut, and when in adjustment mode the locking sleeve engages the adjusting nut to restrict it from rotating with the chuck head.

4. A power tool according to claim 3, wherein rotation of the chuck head relative to the adjustment nut moves two or more jaws to grip or release the drill bit.

5. A power tool according to claim 1, wherein the gear assembly includes a ring gear that is movable in the direction of the axis of the power tool to change between slow speed and fast speed, the power tool including linkage means to connect the ring gear to the locking sleeve to move with the ring gear.

* * * * *